Figure 1:
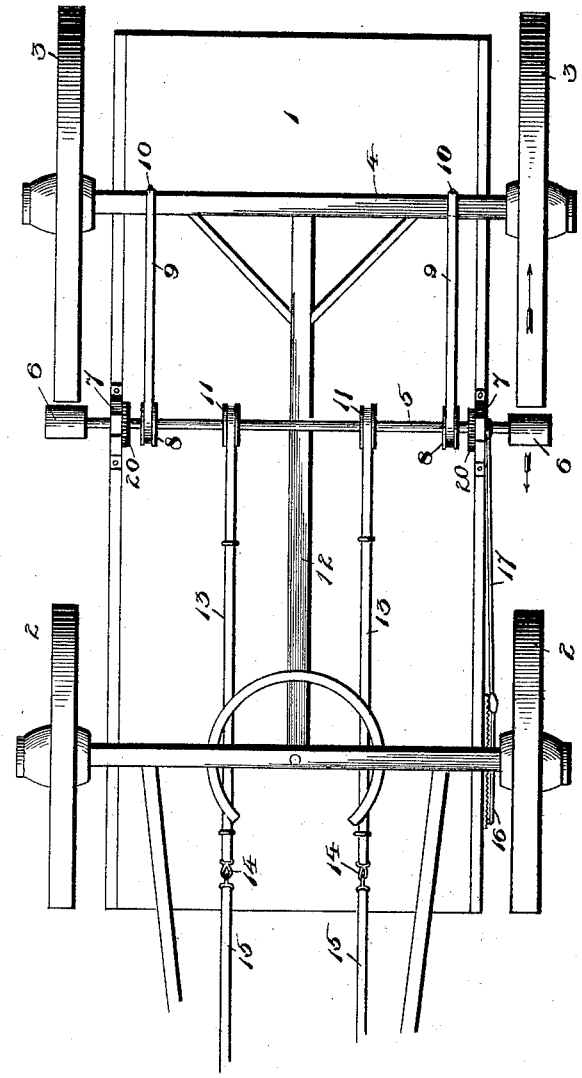

No. 610,678. Patented Sept. 13, 1898.
A. H. HARRYMAN.
HORSE HITCH AND BRAKE.
(Application filed Mar. 5, 1897.)
(No Model.) 2 Sheets—Sheet 1.

WITNESSES

INVENTOR
Archibald H. Harryman
By John Wedderburn
Attorney

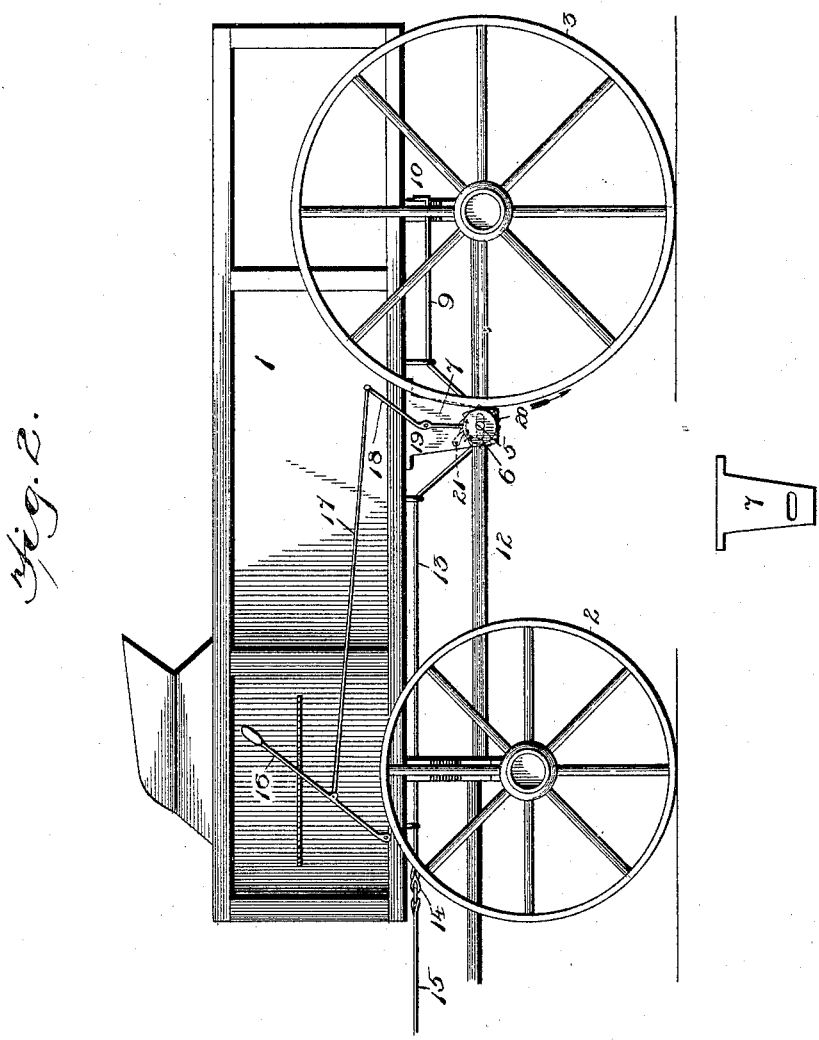

UNITED STATES PATENT OFFICE.

ARCHIBALD H. HARRYMAN, OF LOUISVILLE, KENTUCKY.

HORSE-HITCH AND BRAKE.

SPECIFICATION forming part of Letters Patent No. 610,678, dated September 13, 1898.

Application filed March 5, 1897. Serial No. 626,013. (No model.)

*To all whom it may concern:*

Be it known that I, ARCHIBALD H. HARRYMAN, a citizen of the United States, residing at Louisville, in the county of Jefferson and State of Kentucky, have invented certain new and useful Improvements in Horse-Hitches and Brakes; and I do hereby declare the following to be a full, clear, and exact description of the invention, such as will enable others skilled in the art to which it appertains to make and use the same.

This invention relates to brakes for wagons and vehicles in general; and the object in view is to provide a combined brake and hitch which may be used either as an ordinary brake for arresting the forward or backward movement of the vehicle or as a combined brake and hitch for the purpose of preventing the draft-animal from running off with the vehicle or backing the same when the animal is left standing in the absence of the driver.

To this end the invention consists in certain novel features and details of construction hereinafter particularly set forth, illustrated in the drawings, and pointed out in the claims hereto appended.

In the accompanying drawings, Figure 1 is a bottom plan view of a wagon, showing the improved mechanism applied thereto. Fig. 2 is a side elevation of the same.

Similar numerals of reference designate corresponding parts in the figures of the drawings.

In the accompanying drawings I have represented the improved mechanism as applied to an ordinary wagon, in which 1 designates the body of the wagon; 2, the front wheels thereof; 3, the rear wheels, and 4 the rear axle.

For the purpose of embodying the improvements herein contemplated I mount a transverse shaft 5 under the body of the wagon, the same being located just in advance of the rear wheels 3 and being provided at its ends with brake-shoes 6, in the form of friction-rollers, secured rigidly to the end portions of the shaft 5 and adapted to contact with the tires of the wheels. Attached to the bottom of the body 1 and under the side sills thereof are hangers 7, in which the shaft 5 is supported. These hangers are provided with slots extending longitudinally of the wagon, whereby the shaft 5, which is mounted in said slots, is adapted to roll back and forth. Just inside of the hangers 7 and mounted fast on the shaft 5 are sheaves or pulleys 8, having secured thereto the forward ends of a pair of flexible straps 9, which extend rearwardly and connect at their opposite or rear ends to the rear axle 4, as shown at 10. Secured fast to the shaft 5 are other sheaves or pulleys 11, which are arranged between the pulleys 8 and the reach-bar 12 of the running-gear. Attached to the pulleys 11 are flexible straps 13, which extend forward to the front of the wagon, where they are provided with eyes or snap-hooks 14, adapted to engage other eyes or snap-hooks on the rear ends of a pair of lines or straps 15, which extend forward and connect to the bridle-bit of the animal.

16 designates a brake-lever mounted within convenient reach of the driver and from which a connecting-rod 17 extends rearward, where it is pivotally attached to a second lever 18, fulcrumed at 19 intermediate its ends, preferably on one of the hangers 7, and connected at its lower end with the shaft 5 in such manner that by rocking the lever 16 the shaft 5 may be moved toward the rear axle 4 for forcing the brake shoes or rollers 6 into contact with the wheels 3. Now when these rollers 6 are in frictional contact with the wheels 3 the rollers 6 will be rotated by the wheels 3, thereby turning the shaft 5 and winding the straps 9 thereon. The effect of this is to force the rollers 6, which constitute brake-shoes, with greater pressure against the wheels 3, thus effecting a stoppage of said wheels and retarding the forward progress of the animal. Should an animal start forward, the straps 13 are immediately drawn in a corresponding direction, and by reason of their being wound upon the pulleys 11 a rotation of the shaft 5 is effected, which causes the straps 9 to wind upon the pulleys 8, in this manner forcing the brake shoes or rollers 6 into contact with the wheels 3.

The mechanism described thus operates not only as a brake for the vehicle, but as a hitch for the animal, so that the driver upon leaving the vehicle does not need to hitch the animal to a stationary object, thus effecting a great saving in time.

In some cases it may be desirable to mount fast upon the shaft 5 a ratchet-wheel 20, and to mount on a suitable support attached to the body of the vehicle a pawl or clutch 21, which is adapted to engage the ratchet-wheel 20 for preventing retrograde movement of the shaft 5 after the rollers or shoes 6 have been brought into contact with the wheels 3. This, however, is not an essential feature of the present invention and may, if desired, be omitted without sacrificing any of the advantages thereof. Suitable guides or loops may be provided for the passage of the straps 13, so that they may be confined closely to the bottom of the body 1 of the vehicle, as shown in Fig. 2.

Having thus described the invention, what is claimed as new, and desired to be secured by Letters Patent, is—

1. In a vehicle-brake, the combination with a vehicle, of a transverse shaft carrying at its opposite ends friction-rollers fast thereon for contact with the wheels, slotted hangers in which said shaft is mounted to roll when applied to wheels by the lever 16, flexible straps interposed between said shaft and a stationary axle, and other straps connected to said shaft and extending forward and having provision for their attachment to lines or straps forming a part of the harness of the animal, substantially as described.

2. In a vehicle-brake, the combination with a vehicle, of a transverse shaft carrying at its ends fixed friction-rollers for engaging the wheels, a flexible strap interposed between said shaft and one of the stationary vehicle-axles, and a second flexible strap connected to said shaft and extending forward and having provision for its attachment to the draft-animal, substantially as described.

3. In a vehicle-brake, the combination with a vehicle, of a transverse shaft mounted in hangers on the body of the vehicle and adapted to move laterally toward and away from one of the vehicle-axles, friction-rollers fast on said shaft and arranged for contact with the wheels, a flexible strap interposed between and connected to said shaft and the vehicle-axle, a lever arranged within the reach of the driver, and connections between said lever and shaft, whereby the shaft may be moved laterally as indicated, substantially as described.

In testimony whereof I have signed this specification in the presence of two subscribing witnesses.

ARCHIBALD H. HARRYMAN.

Witnesses:
RUTH MCCARTHY,
JAMES O'NEIL.